(12) United States Patent
Oyanagi et al.

(10) Patent No.: US 6,850,936 B2
(45) Date of Patent: Feb. 1, 2005

(54) DATA EXTRACTING METHOD, INFORMATION PROCESSING APPARATUS, AND RECORDING MEDIUM

(75) Inventors: Shigeru Oyanagi, Yokohama (JP); Akihiko Nakase, Tokyo (JP); Kazuto Kubota, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 452 days.

(21) Appl. No.: 09/946,362

(22) Filed: Sep. 6, 2001

(65) Prior Publication Data

US 2002/0029220 A1 Mar. 7, 2002

(30) Foreign Application Priority Data

Sep. 7, 2000 (JP) ..................................... 2000-271903

(51) Int. Cl.[7] .............................................. G06F 17/30
(52) U.S. Cl. ........................... 707/6; 345/418; 375/346; 382/232
(58) Field of Search ............................. 707/6; 345/418; 375/346; 382/232

(56) References Cited

U.S. PATENT DOCUMENTS

| 6,249,614 B1 | * | 6/2001 | Kolesnik et al. ............. 382/251 |
| 2003/0067461 A1 | * | 4/2003 | Fletcher et al. .............. 345/420 |

FOREIGN PATENT DOCUMENTS

| JP | 11-184948 | 7/1999 |

OTHER PUBLICATIONS

Ujaldon et al, Experimental Evaluation of Efficient Sparse Matrix Distributions, Intl Conf. on Supercomputing, PROC 10th ICS, 1996, Philadelphia, PA, pp. 78–85.*

Badrul Sarwar, et al., "Analysis of Recommendation Algorithms for E–Commerce", EC '00, Oct. 17–20, 2000, 9 pages.

Rakesh Agrawal, et al., "Fast Algorithms for Mining Association Rules", Proceedings of the 20th VLDB Conference, 1994, pp. 487–499.

Shoichi Ueda, "Data Analysis Method II," Lets study with personal computers, published Jun. 15, 1991 by Asakura Shoten, First Edition, pp. 68–73.

* cited by examiner

Primary Examiner—Wayne Amsbury
(74) Attorney, Agent, or Firm—Oblon, Spivak, McClelland, Maier & Neustadt, P.C.

(57) ABSTRACT

A data extraction method comprising: storing a plurality of objects to be processed in a memory device, each of the objects including a single set of two data entities which differ in attribute from each other, converting each of the objects stored in the memory device to one of elements arranged in a matrix, by setting one of the two data entities at a row of the matrix and the other at a column of the matrix, extracting from the matrix a submatrix which is generated by replacing rows and columns of the matrix and is dense with the objects, the submatrix being configured by a part of the matrix.

20 Claims, 6 Drawing Sheets

Item

|   | a | b | c | d | e | f | g |
|---|---|---|---|---|---|---|---|
| A | 0 | 0 | 0 | 1 | 0 | 0 | 0 |
| B | 0 | 0 | 1 | 0 | 1 | 0 | 0 |
| C | 0 | 0 | 0 | 0 | 0 | 1 | 0 |
| D | 1 | 0 | 1 | 0 | 0 | 0 | 1 |
| E | 0 | 0 | 0 | 0 | 0 | 0 | 0 |
| F | 0 | 0 | 0 | 0 | 1 | 0 | 1 |

Customer

| Row number | A | B | C | D | E | F | G | H | I | J |
|---|---|---|---|---|---|---|---|---|---|---|
| Number of received markers | 5 | 5 | 4 | 4 | 3 | 3 | 2 | 2 | 1 | 1 |

| Threshold value | Area (number of rows × number of columns) | Density (total number of received markers/area) |
|---|---|---|
| 5 | 2×5=10 | 10/10=1 |
| 4 | 4×5=20 | 18/20=0.9 |
| 3 | 6×5=30 | 24/30=0.8 |
| 2 | 8×5=40 | 28/40=0.7 |
| 1 | 10×5=50 | 30/50=0.6 |

DATA EXTRACTING METHOD, INFORMATION PROCESSING APPARATUS, AND RECORDING MEDIUM

CROSS-REFERENCE TO RELATED APPLICATIONS

This application is based upon and claims the benefit of priority from the prior Japanese Patent Application No. 2000-271903 filed Sep. 7, 2000, the entire contents of which are incorporated herein by reference.

BACKGROUND OF THE INVENTION

1. Field of the Invention

The present invention relates to a data extracting method for extracting information useful for marketing, and the like from a record as an enormous processing object such as a utilization history of a credit card.

2. Description of the Related Art

A data mining technique has been noted as a technique for extracting knowledge from a large-scale database. Various techniques such as decision tree, neural net, finding of an association rule, and clustering have been proposed as data mining techniques. It is expected that a characteristic knowledge hidden in the database is extracted by such techniques and applied to various fields such as marketing.

Customer management is performed using a card in retailers such as a supermarket. When the card is used, sales information such as a customer who has bought an item can electronically be obtained. When the sales information is analyzed, properties of the customer and item can be known, and the information can effectively be utilized as marketing information. A clustering technique is applied to such a situation, and used in clustering customers having similar purchase tendencies.

An example of clustering will briefly be described. In the example, a certain retailer deals in three items (x, y, z), and the sales information of four customers A, B, C, D who have bought any one of the items is used for clustering.

It is assumed that the customer A buys the item x, the customer B buys the items y, z, the customer C buys the item y, and the customer D buys the items x, z.

A three-dimensional space is assumed for the three items, each dimension of the three-dimensional space corresponding to each of the three items. The four customers are represented by points in the space, and the customers are clustered. That is, respective dimensional values are set to binary values "0" and "1". The dimensional value is set to "1" when a certain customer buys a certain item, and set to "0" when the customer does not buy the item.

In such an x-y-z space, a coordinate of the customer A is (1, 0, 0), coordinate of the customer B is (0, 1, 1), coordinate of the customer C is (0, 1, 0), and coordinate of the customer D is (1, 0, 1). When a distance between the customers is represented by a Hamming distance on three-dimensional vectors, the distance between the customers having similar tendencies to buy a item is reduced, and a cluster is formed. For example, a Hamming distance between the customers B and C is "1", and a Hamming distance between the customers A and D is "1". Since the distances are smaller than those of other combinations, two clusters (B, C) and (A, D) are formed.

When a four-dimensional space is assumed for the four customers, each dimension of the four-dimensional space corresponding to each of the four customers, the three items are represented by the points in the space. The item can be clustered similarly as described above.

There is originally no concept of order or distance in customer data of the customers A to D. Moreover, there is originally no concept of order or distance in item data of the items x to z.

Therefore, it is necessary to select sales information having a relation which can be assumed beforehand, such as the sales information corresponding to an item type and an age group of customers from the sales information before performing the clustering. For example, item data classified as audio items are selected from the total item data, and the customers are clustered into the spaces of, for example, speaker, CD players, cassette players and so on, each dimension of the space corresponding to each of the audio items. Moreover, items which high school students prefer to buy are clustered. In this case, only the high school students are selected beforehand from all of the customer data, and the items are clustered in the space of the high school students, each dimension of the space corresponding to each of the high school students.

In clustering, when the customers A and B often buy audio items, but their purchasing habits (buying tendencies) completely differ in other types of items, the distance between the customers A and B increases, and the customers A and B do not belong to the same cluster in some cases. Similarly, when items X and Y are often bought by high school students but their buying tendencies are different from each other by any other age group of customers, the items X and Y do not belong to the same cluster in some cases.

When a relation between data can be clearly defined like the relation between an item category and a customer age group, clustering is effective. However, when the relation between the data cannot be defined beforehand, there is a problem that clustering cannot be applied.

Moreover, when the number of dimensions of the space for performing the clustering is enormous, it is disadvantageously difficult to extract similarities in the purchasing habits of the customers regarding an item group belonging to a specific category, or similarities of the purchasing habits of the items regarding a specific customer group.

BRIEF SUMMARY OF THE INVENTION

The present invention has been developed in consideration of the aforementioned problem, and an object thereof is to provide a data extracting method in which a group of data having a common feature can easily be extracted from a plurality of data having no concept of order or distance among individual data, such as a customer and item, and a data extraction apparatus using the data extracting method.

According to an aspect of the present invention, there is provided a data extraction method comprising: storing a plurality of objects to be processed in a memory device, each of the objects including a single set of two data entities (data items) which differ in attribute from each other; converting each of the objects stored in the memory device to one of elements arranged in a matrix, by setting one of the two data entities at a row of the matrix and the other at a column of the matrix; extracting from the matrix a submatrix which is generated by replacing (permuting or exchanging) rows and columns of the matrix and is dense with the objects, the submatrix being configured by a part of the matrix.

According to an aspect of the present invention, there is provided a data extraction method comprising: storing a plurality of objects to be processed in a memory device, each of the objects including a single set of two data entities (data items) which differ in attribute from each other; converting each of the processing objects stored in the memory device to one of elements arranged in a matrix, by setting one of the two data entities at a row of the matrix and the other at a column of the matrix; selecting one or more columns from all of the columns of the matrix based on the number and positions of the objects located in each of the columns, to obtain one or more selected columns, selecting one or more rows from all of the rows of the matrix based on the number and positions of the objects located in each of the rows, to obtain one or more selected rows, extracting from the matrix a submatrix which is configured by the selected columns and the selected rows, and is dense with the objects.

According to an aspect of the present invention, there is provided a data extraction method comprising: (a) storing a plurality of objects to be processed in a memory device, each of the objects including a single set of two data entities (data items) which differ in attribute from each other; (b) converting each of the objects stored in the memory device to one of elements arranged in a matrix, by setting one of the two data entities at a row of the matrix and the other at a column of the matrix; (c) selecting one row from the matrix to obtain a selected row; (d) detecting one or more columns which cross the selected row through one of the objects, to obtain one or more detected columns; (e) increasing one or more first counters corresponding to each of the detected columns by 1; (f) selecting one or more columns based on values of the first counters, to obtain one or more selected columns; (g) detecting one or more rows which cross each of the selected columns through one of the objects, to obtain one or more detected rows; (h) increasing one or more second counters corresponding to each of the detected rows by 1; (i) selecting one or more rows based on values of the second counters, to obtain one or more selected rows; (j) detecting one or more columns which cross each of the selected rows through one of the objects, to obtain one or more detected columns; (k) repeating processes (e)–(j) until the selected columns and the selected rows satisfy a given convergence condition; (l) extracting from the matrix a submatrix which is configured by the selected columns and the selected rows when the given convergence condition is satisfied, and is dense with the objects.

According to an aspect of the present invention, there is provided a data extraction method comprising: (a) storing a plurality of objects to be processed in a memory device, each of the objects including a single set of two data entities which differ in attribute from each other; (b) converting each of the objects stored in the memory device to one of elements arranged in a matrix, by setting one of the two data entities at a row of the matrix and the other at a column of the matrix; (c) selecting one column from the matrix to obtain a selected column; (d) detecting one or more rows which cross the selected column through one of the objects, to obtain one or more detected rows; (e) increasing one or more first counters corresponding to the one or each of the more detected rows by 1; (f) selecting one or more rows based on values of the first counters, to obtain one or more selected rows; (g) detecting one or more columns which cross the one or each of the more selected rows through one of the object, to obtain one or more detected columns; (h) increasing one or more second counters corresponding to the one or each of the more detected columns by 1; (i) selecting one or more columns based on values of the second counters, to obtain one or more selected columns; (j) detecting one or more rows which cross the one or each of the more selected columns through one of the objects, to obtain one or more detected rows; (k) repeating steps (e)–(j) until the selected rows and the selected columns satisfy a given convergence condition; (l) extracting from the matrix a submatrix which is configured by the selected rows and the selected columns when the given convergence condition is satisfied, and is dense with the objects.

According to an aspect of the present invention, there is provided a data extraction method comprising: storing a plurality of objects to be processed in a memory device, each of the objects including a single set of three data entities (data items) which differ in attribute from one another; converting each of the objects stored in the memory device to an element in a 3-dimensional space including a plurality of axes each of which corresponds to the attribute, the three data entities corresponding to x-, y- and z-components in the 3-dimensional space respectively; extracting a subspace which is generated by replacing (permuting or exchanging) data arrays corresponding to each axis and is dense with the objects, from the 3-dimensional space.

According to an aspect of the present invention, there is provided an information processing apparatus comprising: a memory device configured to store a plurality of objects to be processed, each of the objects including a single set of two data entities (data items) which differ in attribute from each other; a converter configured to convert each of the objects stored in the memory device to one of elements arranged in a matrix, by setting one of the two data entities at a row of the matrix and the other at a column of the matrix; a data extraction device configured to extract from the matrix a submatrix which is generated by replacing (permuting or exchanging) rows and columns of the matrix and is dense with the objects, the submatrix being configured by a part of the matrix.

According to an aspect of the present invention, there is provided an information processing apparatus comprising: a memory device configured to store a plurality of objects to be processed, each of the objects including a single set of two data entities (data items) which differ in attribute from each other; a converter configured to convert each of the objects stored in the memory device to one of elements arranged in a matrix, by setting one of the two data entities at a row of the matrix and the other at a column of the matrix; a first selector configured to select one or more columns from all of the columns of the matrix based on the number and positions of the objects located in each of the columns, to obtain one or more selected columns, a second selector configured to select one or more rows from all of the columns of the matrix based on the number and positions of the objects located in each of the rows, to obtain one or more selected rows, a data extraction device configured to extract from the matrix a submatrix which is configured by the selected columns and the selected rows, and is dense with the objects.

According to an aspect of the present invention, there is provided an information processing apparatus comprising: a memory device configured to store a plurality of objects to be processed, each of the objects including a single set of two data entities (data items) which differ in attribute from each other; a converter configured to convert each of the objects stored in the memory device to one of elements arranged in a matrix, by setting one of the two data entities at a row of the matrix and the other at a column of the matrix; a plurality of first counters, each of which corresponds to each column, a plurality of second counters, each of which corresponds to each row, a first selector configured to select one row from the matrix to obtain a selected row; a second selector which selects one or more columns and one or more rows beginning at the selected row to obtain one or more selected columns and one or more selected rows, by repeating a first process and a second process alternately, until the selected columns and the selected rows satisfy a given convergence condition, and an extraction device configured to extract from the matrix a submatrix which is configured by the selected columns and the selected rows when the given convergence condition is satisfied, and is dense with the objects, the first process detecting one or more columns which cross the selected rows including the selected row through one of the objects, to obtain one or more detected columns, increasing one or more first counters corresponding to each of the detected columns by 1, and selecting one or more columns based on values of the first counters, and the second process detecting one or more rows which cross the selected columns through one of the objects, to obtain one or more detected rows, increasing one or more second counters corresponding to each of the detected rows by 1, and selecting one or more rows based on values of the second counters.

DETAILED DESCRIPTION OF THE INVENTION

The embodiments of the present invention will be described hereinafter with reference to the drawings.

Figure 11:
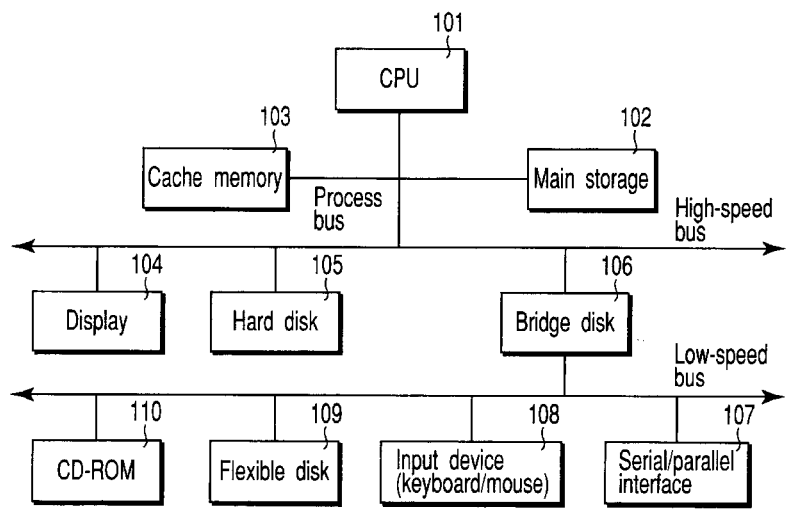
FIG. 11 is a block diagram showing an example of a configuration of a main part of an information processing apparatus according to the embodiment of the present invention.

FIG. 11 shows an example of a configuration of a main part of an information processing apparatus according to the embodiments of the present invention. The apparatus is mainly configured by a CPU 101, main storage 102, cache memory 103, display 104, hard disk 105, input device 108 such as a keyboard and mouse, flexible disk drive 109, CD-ROM drive 110, and the like, and these respective components are connected to one another using buses. The CPU 101, main storage 102 and cache memory 103 are connected via an ultra-high speed bus (processor bus), and the hard disk 105, display 104, and other peripherals requiring a high speed property are connected via a high speed bus (e.g., PCI bus). A low speed bus connected to the high speed bus via a bridge circuit 106 is connected to low speed peripherals such as the input device 108 including the keyboard, mouse, and the like, flexible disk drive 109, CD-ROM drive 110, and serial/parallel interface 107.

In this configuration, the CPU 101 reads programs or data stored in the hard disk 105, loads the programs or the data into the main storage 102, reads and processes these programs or data, stores the processing result in the main storage 102, displays the result on the display 104, or writes data into the hard disk 105.

In the embodiments, the objects to be processed (the processing objects) are a plurality of records, each of the records is a set of two data entities (data items), and each of the data entities differs in attribute from each other. For example, the objects to be processed are a plurality of records, each of the records is a set of two data entities, one of the data entities is a customer and the other is an item bought by the customer. The records are inputted to a predetermined terminal apparatus and transmitted to the information processing apparatus of FIG. 11 via a predetermined communication line and the serial/parallel interface 107 of the information processing apparatus, and stored in the hard disk 105. Or, the records are directly inputted to the input device 108 of the information processing apparatus of FIG. 11, and stored in the hard disk 105. A collection of the records stored in the hard disk 105 is a database of the information processing apparatus of FIG. 11. The information processing apparatus of FIG. 11 executes processing of the objects in the database in the following first to third embodiments.

First Embodiment

First, a data extracting method of the embodiment of the present invention will roughly be described. In the example described below, the objects to be processed are a plurality of records, each of the records is a set of two data entities (data items), one of the data entities is a customer and the other is an item bought by the customer.

Figures 3, 4:
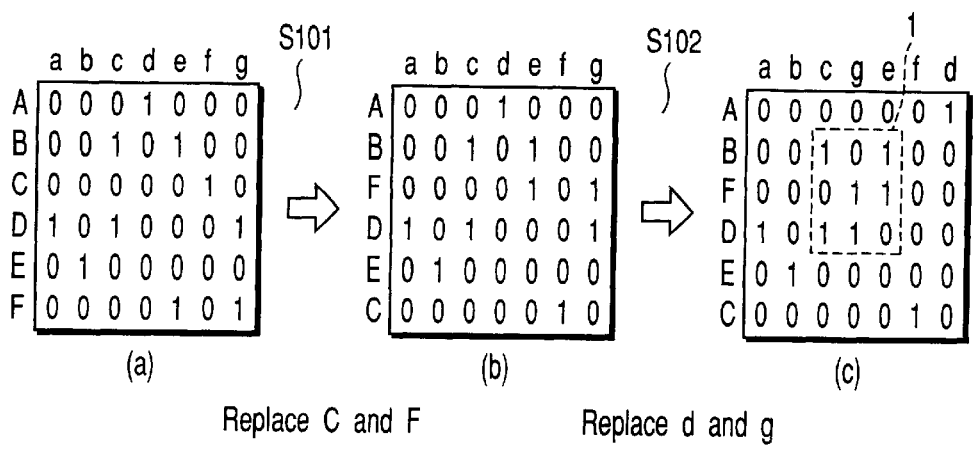
FIG. 3 is a view showing a representation example of a matrix form of a plurality of records.
FIG. 4 is an explanatory view of the concept of a data extracting method according to the first embodiment of the present invention.

FIG. 3 shows a matrix, in which each of the records represents one of the elements of the matrix, by setting the customer of the record at (in) a column and the item of the record at (in) a row. Since the value of each of the elements of the matrix is a binary value, the matrix shown in FIG. 3 is called a "binary value matrix". Customers shown in the row are six customers A, B, C, D, E, F. Items shown in the column are seven items a, b, c, d, e, f, g.

Each of the elements of the matrix are represented as $M\{i, j\}$, and $M\{i, j\}=1$ indicates that customer i has bought item j, and a record {customer=i, item=j} exists in the database. On the other hand, $M\{i, j\}=0$ indicates that customer i has not bought item j, and a record {customer=i, item=j} does not exist in the database. Even if a plurality of {customer=i, item=j}'s exist in the database, which means that a customer i has bought a plurality of the same item j, a value of the element of the matrix is set to "1". In some cases, as another interpretation of $M\{i, j\}$, only when a plurality of the same records indicating {customer=i, item=j} exist in the database and the number of the same records is not lower than a predetermined value, the matrix element M{i, j} may be represented as "1". In FIG. 3, since the order of the customers and the item is arbitrary, the order may be changed.

FIG. 4 shows a process of replacing the rows or the columns of the matrix shown in FIG. 3 and extracting a submatrix in which "1" is densely arranged.

In FIG. 4, an operation (step S101) of replacing rows C and F with each other is performed on the matrix shown in FIG. 3 (FIG. 4(a)). Subsequently, an operation (step S102) of replacing columns d and g with each other is performed on the matrix (FIG. 4(b)) obtained by replacing the row C with the row F. Then, a submatrix 1 which is configured by customers B, F, D and items c, g, e and in which "1" is densely arranged is extracted in the matrix (FIG. 4(c)) obtained by replacing the column d with the column g.

A meaning of this submatrix 1 can be interpreted as follows: "the customers B, F, D have a common property regarding the items c, g, e" or "the items c, g, e have a common property regarding the customers B, F, D". Moreover, an element having a value "0" in the submatrix 1 is interpreted as being highly likely to turn into "1" in the future. For example, the element can be interpreted to mean "there is a high possibility that customer B will buy item g". In this manner, by replacing the rows or the columns with each other in the matrix in which the records are arranged as shown in FIG. 3, the submatrix 1 in which the records (objects to be processed) are densely arranged ("1" is densely arranged) is extracted. This corresponds to extraction of correlative customers and the commodities.

Figure 1:
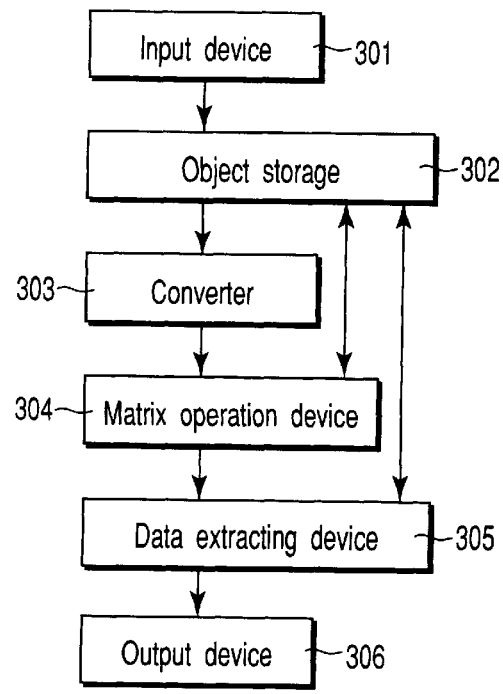
FIG. 1 is a functional block diagram of a data extracting apparatus according to a first embodiment of the present invention.

FIG. 1 is a functional block diagram of the information processing apparatus shown in FIG. 11 for realizing the data extracting method according to a first embodiment. Additionally, here the information processing apparatus to which the data extracting method of the present invention is applied is called the data extraction apparatus.

The data extraction apparatus shown in FIG. 1 is configured by an input device 301, an object storage 302, a converter 303, a matrix operation device 304, a data extracting device 305, and an output device 306.

The input device 301 is a device for inputting a plurality of records, each of the records is a set of two data entities, one of the data entities is a customer and the other is an item bought by the customer. The input device 301 is configured by the serial/parallel interface 107 and input device 108 shown in FIG. 11.

The object storage 302 is a database in which the plurality of records inputted via the input device 301 are stored. The records stored in the object storage 302 are the objects to be processed by the data extraction apparatus shown in FIG. 1. The object storage 302 is configured by the hard disk 105 shown in FIG. 11.

The converter 303 converts each of the objects stored in the object storage 302 to one of the elements arranged in a matrix, by setting one (the item) of the two data entities at a row of the matrix and the other (the customer) at a column of the matrix, and generates the matrix in which the objects are arranged as shown in FIG. 3. Each of the objects in the matrix is represented as "1", as described above.

The matrix operation device 304 performs an operation of replacing (or permuting or exchanging) the rows or the columns with each other on the matrix in which the objects are arranged as shown in FIG. 3.

The data extracting device 305 extracts from the matrix as shown in FIG. 3 a submatrix in which the objects (corresponding to "1") are densely arranged ("1"s are densely arranged)

The converter 303, the matrix operation device 304, and the data extraction device 305 are configured by the CPU 101, hard disk 105, and main storage 102 shown in FIG. 11.

The output device 306 displays, for example, the submatrix extracted by the data extraction device 305, and is configured by the display 104 and hard disk 105 shown in FIG. 11.

A procedure for the data extraction by the data extraction apparatus shown in FIG. 1 will be described next with reference to a flowchart shown in FIG. 5. Here, the procedure for generating the submatrix in which "1" is densely arranged in a left upper portion of the matrix is performed. That is, the row is replaced so that the elements having a value "1" moves upwards, and the column is replaced so that elements having a value "1" moves leftwards.

Figure 5:
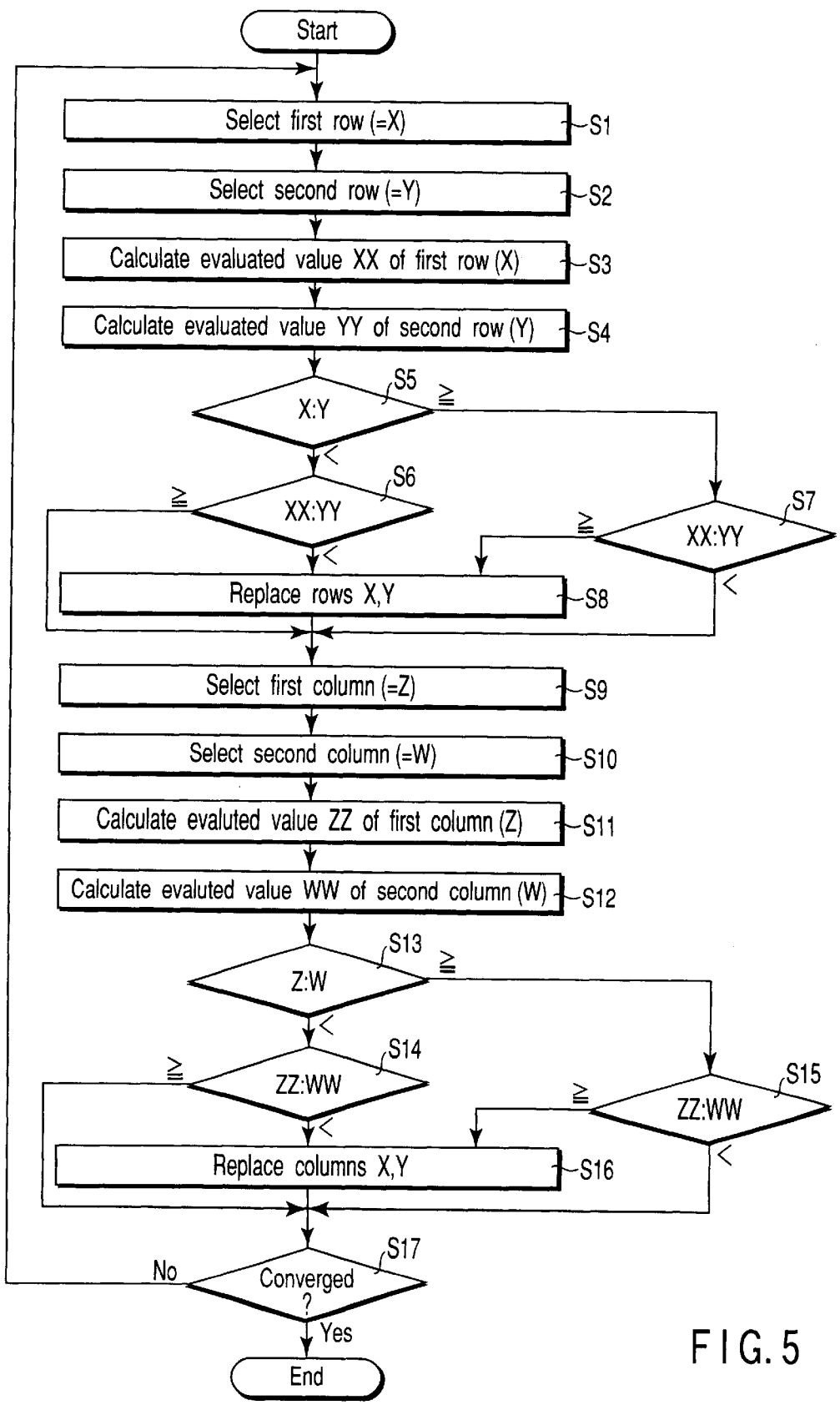
FIG. 5 is a flowchart of the data extracting method according to the first embodiment.
Figure 6:
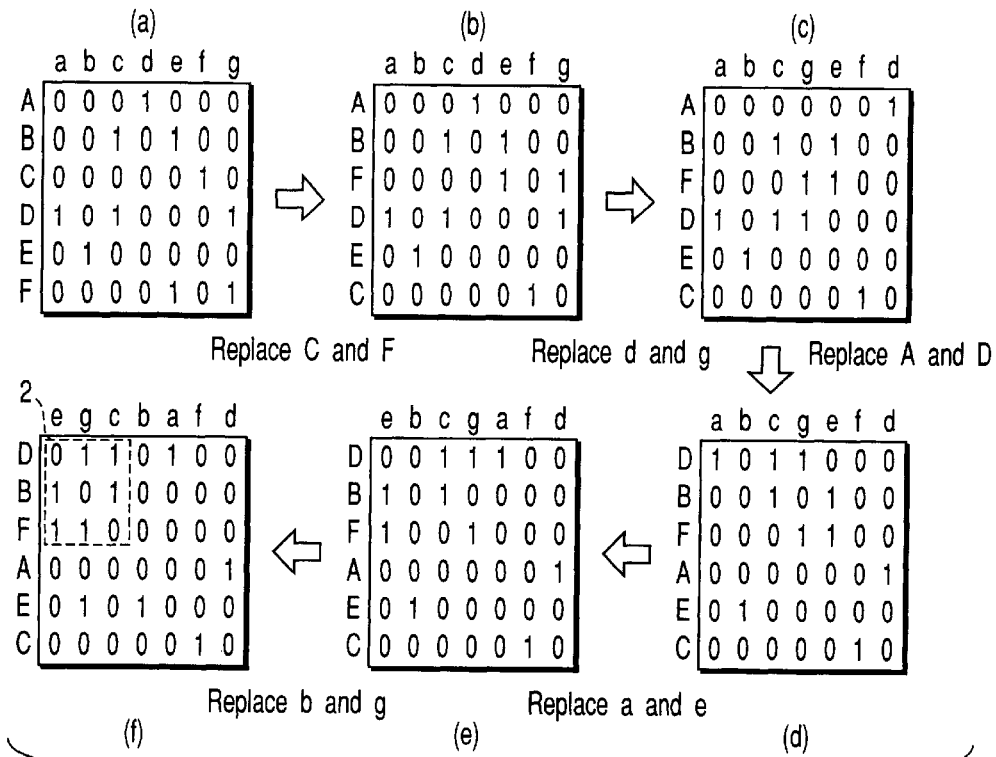
FIG. 6 is an explanatory view showing a process of a processing of a matrix of FIG. 5 with reference to the flowchart of FIG. 5.

Moreover, FIG. 6 shows a process of the operation of replacing rows or columns on the matrix shown in FIG. 3, according to FIG. 5. The operation according to the flowchart shown in FIG. 5 will be described hereinafter with reference to FIG. 6. Additionally, the process as shown in FIG. 5 is executed by the matrix operation device 304.

First, the converter 303 converts the records stored in the object storage 302 to the elements of the binary value matrix, as described above (see FIG. 3). As shown in FIG. 3 the customers, one of the data entities of the records, are plotted along the vertical axis, and the items, another data entities of the records are plotted along lateral axes. For example the record {customer=C, item=f} is converted to the element M{C, f} of the matrix.

The matrix operation device 304 first selects two rows X, Y as an operation-object (steps S1, S2). There are various methods for selecting a row in step S1, S2. For Example, one of the methods is to select the row at random, and another is to select the row in order from the top. To simplify a convergence condition in step S17, the method of selecting the two rows in order from the top is preferable.

Subsequently, the matrix operation device 304 calculates evaluated values of the rows X, Y selected in the steps S1, S2 (steps S3, S4). There are various methods for calculating the evaluated values, but the method we use herein comprises, (a) obtaining a distance from a right end of the matrix with respect to each of the elements (objects) having a value "1" in the selected row, and (b) obtaining a sum of the distances as the evaluated value of the row. The distance of the element (objects) having a value "1" described above represents the number of elements which exist from a right end of the matrix to the element (object) in the selected row.

For example, in FIG. 6(a), it is assumed that rows C and F are selected. When X and Y denote row numbers, X=3, Y=6 here. In the row C, only an element M{C, f}={3,6} is "1", and the distance of the element M{C, f}={3,6} from the right end is "2". In the row F, elements M {F, e}={6,5} and M {F, g}={6,7} are "1", the respective distances from the right end are "3" and "1", and the sum is "4". Therefore, the evaluated value XX or the evaluated value of the row X is "2" (XX=2), and the evaluated value YY or the evaluated value of the row Y is "4" (YY=4).

Subsequently, the row numbers and evaluated values are compared (steps S5 to S7). If the row number X is smaller than the row number Y (step S5), and the evaluated value XX is smaller than the evaluated value YY (step S6), then rows X and Y are replaced with each other (step S8). If the row number X is smaller than the row number Y (step S5), and the evaluated value XX is not smaller than the evaluated value YY (step S6), then rows X and Y are not replaced. If the row number X is not smaller than the row number Y (step S5), and the evaluated value XX is not smaller than the evaluated value YY (step S7), then rows X and Y are replaced with each other (step S8). If the row number X is not smaller than the row number Y (step S5), and the evaluated value XX is smaller than the evaluated value YY (step S7), then rows X and Y are not replaced.

In this case, since X=3, Y=6, the row number X is smaller than the row number Y. Therefore, the flow advances to step S6 from the step S5. In the step S6, since XX=2, YY=4, the evaluated value XX is smaller than the evaluated value YY. Therefore, the flow advances to step S8, and rows C and F are replaced with each other (see FIG. 6(b)).

Subsequently, two columns are selected in steps S9, S10. There are various methods for selecting the column in step S9, S10. For Example, one of the methods is to select the column at random, and another method is to select the column in order from the left end or right end. To simplify a convergence condition in step S17, the method of selecting the two columns in order from the left end of the matrix is preferable.

In steps S11, S12, the evaluated values of selected columns Z, W are calculated. There are various methods for calculating the evaluated values, but the method we use herein comprises, (a) obtaining a distance from a lower end of the matrix with respect to each of the elements (objects) having a value "1" in the selected column, and (b) obtaining a sum of the distances as the evaluated value of the column. The distance of the element (objects) having a value "1" described above represents the number of elements which exist from a lower end of the matrix to the element (object) in the selected column.

In step S9, S10, It is here assumed that columns d and g are selected. Similarly as the rows, Z and W denote column numbers and, as shown in FIG. 6(b), Z=4, W=7 here. In the column d, only an element M{A, d}={1,4} is "1", and the distance of the element M{A, d}={1,4} from a lower end of the matrix is "6". In the column g, elements M{F, g}={3,7} and M{D, g}={4,7} are "1", the respective distances of these elements from the lower end of the matrix are "4" and "3", and the sum is "7". That is, the evaluated value ZZ or the evaluated value of the column Z is "6" (ZZ=6), and the evaluated value WW or the evaluated value of the column W is "7" (ZZ=7).

Subsequently, the column numbers and evaluated values are compared (steps S13 to S15). If the column number Z is smaller than the column number W (step S13), and the evaluated value ZZ is smaller than the evaluated value WW (step S14), then columns Z and W are replaced with each other (step S16). If the column number Z is smaller than the column number W (step S13), and the evaluated value ZZ is not smaller than the evaluated value WW (step S14), then rows Z and W are not replaced. If the column number Z is not smaller than the column number W (step S13), and the evaluated value ZZ is not smaller than the evaluated value WW (step S15), then columns Z and W are replaced with each other (step S16). If the column number Z is not smaller than the column number W (step S13), and the evaluated value ZZ is smaller than the evaluated value WW (step S15), then columns Z and W are not replaced.

In this case, since Z=4, W=7, the column number Z is smaller than the column number W. Therefore, the flow advances to the step S14 from the step S13. In the step S14, since ZZ=6, WW=7, the evaluated value ZZ is smaller than the evaluated value WW. Therefore, the flow advances to step S16, and columns d and g are replaced with each other (see FIG. 6(a)).

Subsequently, in the matrix shown in FIG. 6(c), rows A and D are similarly selected, the rows A and D are replaced with each other in the step S8, and a matrix shown in FIG. 6(d) is obtained. In the matrix shown in FIG. 6(d), columns a and e are selected, the columns a and e are replaced with each other in the step S16, and a matrix shown in FIG. 6(e) is obtained.

Even when any row is selected from the matrix shown in FIG. 6(e), the replacement of the rows in the step S8 does not occur. Therefore, columns b and g are selected from the matrix shown in FIG. 6(e). In this case, since the columns b and g are replaced with each other in the step S16, a matrix shown in FIG. 6(f) is obtained.

This flow is repeated until a converged state is obtained (step S17). Then, as shown in FIG. 6(f), a submatrix (submatrix configured by rows D, B, F and columns e, g, c) 2 in which "1" is densely arranged is finally generated in the upper left portion of the matrix.

The data extraction device 305 extracts the finally obtained submatrix (portion surrounded with a dotted line) 2, and the output device 306 displays the submatrix 2 in the display 104.

The convergence condition for judging the converged state in step S17 differs with the method of selecting the row and the column in step S1, S2, S9, S10. With the method of selecting the row and the column at random, the converged state may be judged by detecting that a given number of replacements do not occur. Moreover, in another selecting method, the converged state may be judged when the replacement does not occur with respect to all pairs of rows or columns.

As described above, according to the first embodiment, each of the records (the objects to be processed) includes a single set of two data entities that differ in attribute from each other. Each of the records is converted to one of the elements of the matrix, by setting one of the two entities at a row of the matrix and the other at a column of the matrix. Subsequently, the order of the rows or the columns of the matrix is changed, and the submatrix in which the records are densely arranged is extracted. Therefore, it is easy to extract relations from a plurality of data originally having no apparent order or similarities (distance), such as those relating customer to item.

Additionally, in the first embodiment, the replacement is performed in such a manner that the row having a larger evaluated value out of two rows as the operation-objects is moved upwards and the column having a larger evaluated value out of two columns as the operation-objects is moved leftwards. Then, the submatrix in which the records are densely arranged is generated in the left upper portion of the matrix. If a replacing direction of the row or the column is changed, the submatrix can apparently be generated in a left lower portion, a right upper portion, or a right lower portion. For example, to generate the submatrix in the right lower portion, the rows may be replaced so that the row having a larger evaluated value is moved downwards in the steps S3 to S8, and the columns may be replaced so that the column having a larger evaluated value is moved rightwards in the steps S13 to S16.

Moreover, in the first embodiment, each of the records, which includes a single set of two data entities that differ in attribute, such as the customer and item, is arranged in a two-dimensional space such as the matrix, but the present invention is not limited to the two-dimensional space such as the matrix. That is, when the record as the object to be processed includes a single set of three data entities that differ in attribute, each of the records is arranged in three-dimensional space. Each record having three different-attribute data is converted to one of the element in three-dimensional space in which the three attributes are assigned to x, y, z axes, respectively. In this case, an operation of changing the order of the data array of each axial direction (data array of a two-dimensional plane in this example) is performed similarly as described above so that the records are densely arranged in a certain portion in three-dimensional space. Then, a partial space in which the records are densely arranged can be extracted from the three-dimensional space. For example, one of the three data entities is a customer, one of the other two data entities is an item bought by the customer, and the other of the other two data entities is a retail store where the customer bought the item.

Additionally, in the above description, the converged state indicates a state in which further replacement does not occur, but this is not an optimum solution in many cases. When a simulated annealing technique (Kirpatrick S., C. D. Galatt, M. P. Vecchi (1983) Optimization by simulated annealing. Science 220, 671–680) is applied, it is possible to obtain a better solution by causing a state transition in a probable manner.

Second Embodiment

In the first embodiment, all rows/columns are replaced with each other as a comparison-object. Therefore, when a matrix size increases, an execution time becomes enormous. To solve the problem, a data extracting method of a second embodiment will be described. In the method, the row/column as the operation-object is pruned during execution of the operation, so that the matrix size is reduced, and a processing speed is improved.

Additionally, according to the second embodiment of the present invention, a technique of searching for the row and column as the operation-object by using marker propagation (propagation from row to column or from column to row). According to the second embodiment, the marker propagation is expressed as follows. That is, the row (column) transmits the marker to the column (row) which crosses the row (column) through the element having a value "1" in the row (column), and the column (row) receives the marker from the row (column) which crosses the column (row) through the element having a value "1" in the column.

Figure 2:
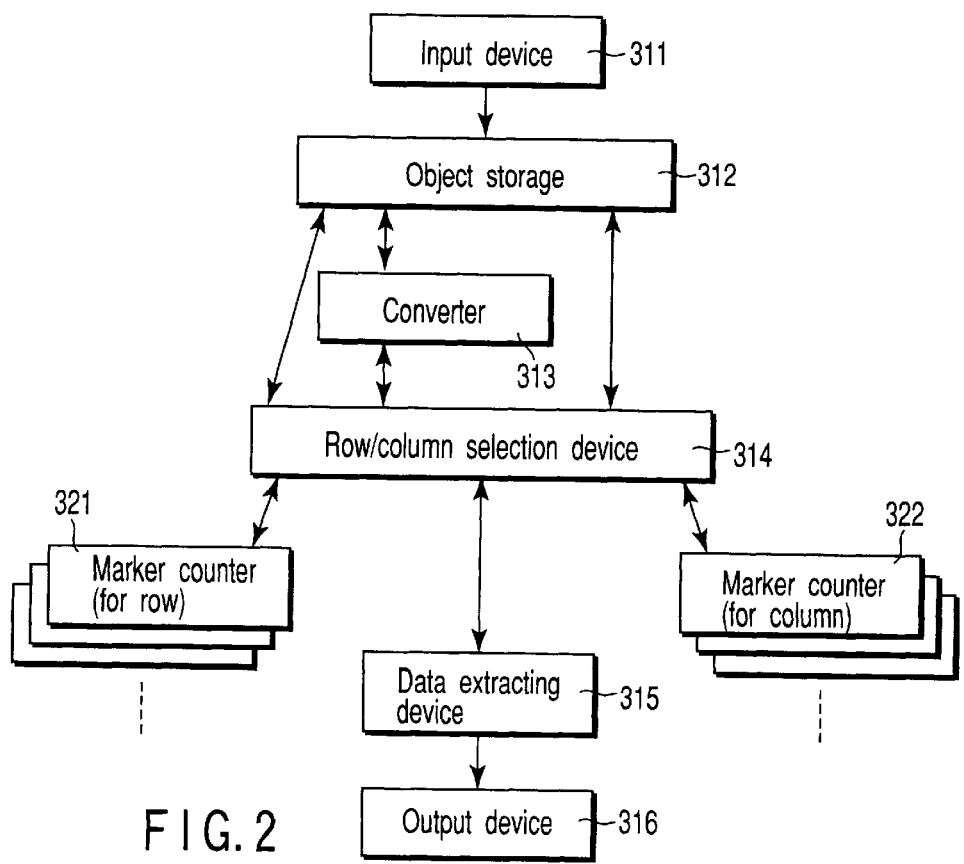
FIG. 2 is a functional block diagram of the data extracting apparatus according to a second embodiment of the present invention.

FIG. 2 is a functional block diagram of the information processing apparatus shown in FIG. 11 for realizing the data extracting method according to the second embodiment. Additionally, here the information processing apparatus to which the data extracting method of a second embodiment is applied is referred to as the data extraction apparatus.

The data extraction apparatus shown in FIG. 2 is configured by an input device 311, an object storage 312, a converter 313, a row/column selection device 314, a data extracting device 315, an output device 316, a plurality of marker counters (for row) 321, and a plurality of marker counters (for column) 322.

The input device 311 is a device for inputting a plurality of records, each of the records is a set of two data entities, one of the data entities is a customer and the other is an item bought by the customer. The input device 301 is configured by the serial/parallel interface 107 and input device 108 shown in FIG. 11.

The object storage 312 is a database in which the plurality of records inputted via the input device 311 are stored. The records stored in the object storage 312 are the objects to be processed by the data extraction apparatus shown in FIG. 2. The object storage 312 is configured by the hard disk 105 shown in FIG. 11.

The converter 313 converts each of the objects stored in the object storage 312 to one of elements arranged in a matrix, by setting one (the item) of the two data entities at (in) a row of the matrix and the other (the customer) at (in) a column of the matrix, and generates the matrix in which the objects are arranged as shown in FIG. 3. Each of the objects in the matrix is represented as "1", as described above.

The row/column selection device 314 selects one or more rows or one or more columns from the matrix shown in FIG. 3 in which the objects (records) are arranged, based on the values of marker counters (for the row) 321 or marker counters (for the column) 322. And, one or more rows or one or more columns are pruned based on the values of marker counters (for the row) 321 or marker counters (for the column) 322.

Each of the plurality of marker counters (for the row) 321 corresponds to each of the rows of the matrix generated by the converter 313, and counts the number of markers received by the corresponding row.

Each of the plurality of marker counters (for the column) 322 corresponds to each of the columns of the matrix generated by the converter 313, and counts the number of markers received by the corresponding column.

The data extraction device 315 extracts from the matrix generated by the converter 313 a submatrix in which the objects (corresponding to "1") are densely arranged ("1"s are densely arranged).

The converter 313, row/column selection device 314, and data extraction device 315 are configured by the CPU 101, hard disk 105, and main storage 102 of FIG. 11.

The output device 316 displays, for example, the submatrix extracted by the data extraction device 315, and is configured by the display 104 and hard disk 105 of FIG. 11.

A procedure for the data extraction by the data extraction apparatus of FIG. 2 will next be described with reference to a flowchart shown in FIG. 7. FIG. 8 shows the process of the processing of the matrix shown in FIG. 3. The operation according to flowchart shown in FIG. 7 will be described hereinafter with reference to FIG. 8.

First, the converter 313 converts the plurality of records stored in the object storage 312 to the elements of the binary value matrix, as described above (see FIG. 3).

Subsequently, one row is designated or selected to obtain a selected row (step S21). Here, the row/column selection device 314 selects, for example, row B as the selected row (step S51 of FIG. 8).

Additionally, the selected row as a start point may be designated by a user, or selected by the row/column selection device 314 at random. Alternatively, an uppermost/lowermost row may be selected. Here, a method of selecting the one row is not particularly limited.

As shown in FIG. 3, the marker is transmitted from the row B to the column which crosses the row B through the element having the value "1". Here, as shown in FIGS. 3, 8, in the row B, if elements M{B, c} and M{B, e} have the value "1", then the marker is transmitted to the columns c and e (step S22, step S52 of FIG. 8).

Specifically, the marker propagation is achieved, for example, by the following processing. That is, each of the rows A to F has a plurality of flags of one bit called a "marker bit" (preferably the same number of flags as the number of columns for each row), and each of the columns a to g has a plurality of flags of one bit called a "marker bit" (preferably the same number of flags as the number of rows for each column). For example, in the row B, the elements M{B, c} and M{B, e} have the value "1", then, a first marker bit of each of the columns c and e is set (e.g., to "1").

Subsequently, markers are totaled for each column. That is, since only the first marker bit is set for the columns c and e, "1" is added to each of the marker counters 322 for the column c and the marker counters 322 for the column e, and each marker counter 322 indicates a value "1".

In step S23, the pruning is applied to the column having a total marker number of "1" or less. But, in a first round trip of marker propagation, the pruning is not performed. Moreover, every time pruning end, the marker bit of each row and column, and marker counters 321, 322 are reset (e.g., to "0").

The marker is transmitted from the column c to one or more rows that cross the column c through the element having the value "1" in the column c, and from the column e to one or more rows which cross the column e through the element having the value "1" in the column e. Here, as shown in FIGS. 3, 8, since the elements M{B, c} and M{D, c} have the value "1" in the column c, the marker is transmitted to rows B and D. Moreover, since the elements M{B, e} and M{F, e} have the value "1" in the column e, the marker is transmitted to rows B and F (step S53 of FIG. 8). Then, the first and second marker bits of the row B are set, the first marker bit of the row D is set, and the first marker bit of the row F is set.

Subsequently, the markers are totaled for each row. That is, the first and second marker bits of the row B are set, then "2" is added to the marker counter 321 for the row B, and the marker counter for the row B indicates the value "2". Only the first marker bit is set for the rows D and F, "1" is added to each of the marker counters 321 for the row D and marker counter 321 for the row F, and each of the two marker counters 321 indicates the value "1". Also in this case, since it is in the first round trip, the pruning is not performed (step S54 of FIG. 8).

The flow advances to step S26 to check a state change. In this case, since a state that the row B, D, and F is activated is different from the last state (i.e., the state that only the row B is activated), the processing is continued and returned to the step S22.

In the step S22, the marker is transmitted from the row B to one or more column which crosses the row B through the element having the value "1" in the row B, from the row D to one or more column which crosses the row D through the element having the value "1" in the row D, and from the row F to one or more column which crosses the row F through the element having the value "1" in the row F. Here, as shown in FIGS. 3, 8, if elements M{B, c} and M{B, e} have the value "1" in the row B, then the markers are transmitted to the columns c and e. If the elements M{D, a}, M{D, c} and M{D, g} have the value "1" in the row D, then the markers are transmitted to the columns a, c, g. And, if the elements M{F, e} and M{F, g} have the value "1" in the row F, the markers are transmitted to the columns e and g (step S55 of FIG. 8). That is, the first marker bit of the column a is set, and the first and second marker bits of each of the columns c, e, g are set.

In step S23, the markers are totaled for each row. That is, only the first marker bit of the column a is set, then a totaled result is "1" for the column a, the first and second marker bits of the columns c are set, then a totaled result is "2" for the column c, the first and second marker bits of the columns e are set, then a totaled result is "2" for the column e, the first and second marker bits of the columns g are set, then a totaled result is "2" for the column g. In a second round trip, the pruning is performed, the column a having a small number of markers is deleted (pruned), and the columns c, e, g are activated (step S56 of FIG. 8).

Subsequently, the flow advances to step S24, and the marker is transmitted from the columns c to one or more rows which cross the column c through the element having the value "1" in the column c, from the column e to one or more rows which cross the column e through the element having the value "1" in the column e, from the column g to one or more rows which cross the column g through the element having the value "1" in the column g. Here, as shown in FIGS. 3, 8, elements M{B, c} and M{D, c} have the value "1" in the column c, then the markers are transmitted to the rows B and D. The elements M{B, e} and M{F, e} have the value "1" in the column e, then the markers are transmitted to the rows B and F. The elements M{D, g} and M{F, g} have the value "1" in the column g, then the markers are transmitted to the rows D and F (step S57 of FIG. 8). That is, the first and second marker bits of each of the rows B, D, and F are set.

In step S25, the markers are totaled for each row. That is, since the first and second marker bits of each of the rows B, D, F are set, the total result of each of the rows B, D, F is "2". In this case, since the totaled results of the respective rows are equal to one another, the pruning is not performed, and the rows B, D, F are activated (step S58 of FIG. 8).

The flow advances to the step S26 to check the state change. The state (step S58 of FIG. 8) that the rows B, D, F are activated is the same as the last state (step S54 of FIG. 8). Therefore, it is seen that the state does not change even by further repeating the processing, and the processing thus ends.

As a result, the submatrix configured by the activated rows B, D, F and columns c, e, g can be obtained. This is coincident with the result (see FIG. 6) in the first embodiment.

The data extraction device 315 extracts the finally obtained submatrix (portion surrounded with the dotted line) 2 shown in FIG. 6(f), and the output device 316 displays the submatrix 2 in the display 104.

As described above, according to the second embodiment, each of the records (objects to be processed), which is a set of two data entities, one being a customer and the other an item bought by the customer, is converted to one of the elements arranged in a matrix, by setting one (the item) of the two data entities at a row of the matrix and the other (the customer) at a column of the matrix, and generates the matrix in which the objects are arranged as shown in FIG. 3. (a) One row is selected from the matrix to obtain a selected row. (b) When one or more columns, which cross the selected row through one of the records, are detected, the counter (marker counter 322 in this case) for each of the detected columns is incremented by "1". (c) One or more columns are selected (activated) based on values of the marker counters 322, to obtain one or more selected columns. (d) When one or more rows, which cross each of the selected columns through one of the records, are detected, the counter (marker counter 321 in this case) for each of the detected rows is incremented by "1". (e) One or more rows are selected (activated) based on values of the marker counters 321, to obtain one or more selected rows. (f) When one or more columns, which cross each of the selected rows through one of the records, are detected, the counter (marker counter 322 in this case) for each of the detected columns is incremented by "1". (g) steps (c)–(f) are repeated until the selected columns and the selected rows satisfy a given convergence condition (i.e., until the selected column (or row) are the same as the selected column (or row) before. The submatrix configured by the finally selected row and column is extracted from the matrix. Thereby, the data group (submatrix) having relation can easily be extracted at a high processing speed, from the plurality of data originally having no apparent order or similarities (distance), such as those relating customer to item.

Figure 7:
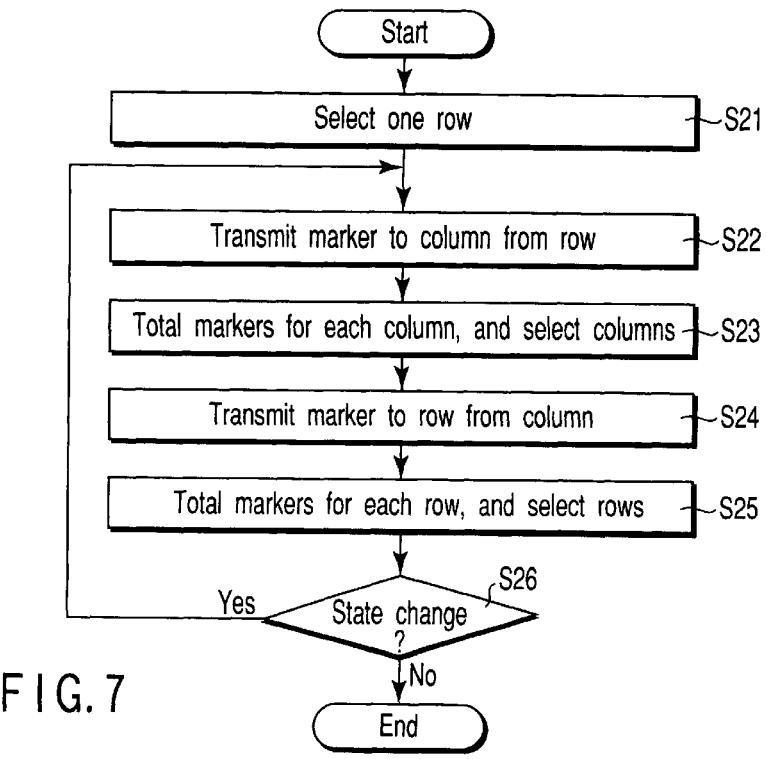
FIG. 7 is a flowchart of the data extracting method according to a second embodiment of the present invention.
Figures 8, 9, 10:
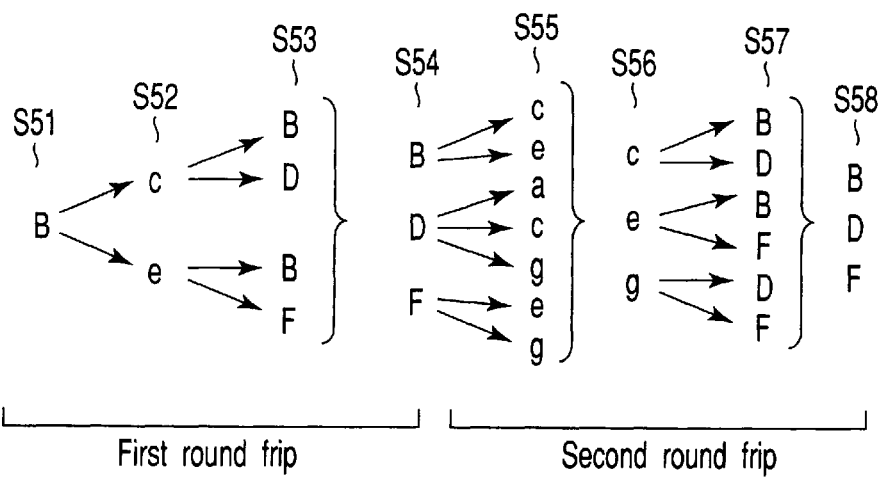
FIG. 8 is an explanatory view showing the process of the processing of the matrix of FIG. 5 with reference to the flowchart of FIG. 7.
FIG. 9 is an explanatory view of a procedure for setting a threshold value of the number of received markers for pruning according to a third embodiment of the present invention.
FIG. 10 is an explanatory view of the procedure for setting the threshold value of the number of received markers for pruning according to the third embodiment of the present invention.

Additionally, in the second embodiment, one row is selected in the step S21 of FIG. 7, but the same effect as described above is obtained by starting from one column in the step S21 of FIG. 7. In this case, (a) One column is selected from the matrix to obtain a selected column. (b) When one or more rows, which cross the selected column through one of the records, are detected, the counter (marker counter 321 in this case) for each of the detected rows is incremented by "1". (c) One or more columns are selected (activated) based on values of the marker counters 321, to obtain one or more selected rows. (d) When one or more columns, which cross each of the selected rows through one of the records, are detected, the counter (marker counter 322 in this case) for each of the detected columns is incremented by "1". (e) One or more columns are selected (activated) based on values of the marker counters 322, to obtain one or more selected columns. (f) When one or more rows, which cross each of the selected columns through one of the records, are detected, the counter (marker counter 321 in this case) for each of the detected rows is incremented by "1". (g) Steps (c)–(f) are repeated until the selected columns and the selected rows satisfy a given convergence condition (i.e., until the selected columns (or rows) are the same as the previously selected column (or row).

Third Embodiment

For the algorithm of pruning described above in the second embodiment, the row or the column whose number of received markers is smaller than a threshold value is pruned (the row or the column whose number of received markers is "1" or less is pruned in the second embodiment).

In a third embodiment, instead of setting the threshold value beforehand, an area and density of a temporary submatrix which is configured by the row and column selected (activated) at a time of pruning are calculated, and used to set the threshold value. This embodiment will describe a method of setting threshold values used as a criterion when selecting (activated) one or more rows/columns in the steps S23, S25 of FIG. 7, based on at least one of a size of a temporary submatrix and a proportion of the number of the records located in the temporary submatrix to the size of the temporary submatrix.

The area of the temporary submatrix can be calculated by multiplying the number of activated rows by the number of activated columns. The area of the temporary submatrix is the size of the temporary submatrix. The density of the temporary submatrix can be calculated by dividing the total number of markers received by the each of the activated rows and columns by the area of the temporary submatrix at the time of the pruning. The density of the temporary submatrix is a proportion of the number of the records located in the temporary submatrix to the size (area) of the temporary submatrix For example, in the steps S55 and S56 of FIG. 8, four columns (a, c, e, g) are reduced to three rows (c, e, g) by the pruning. The number of the last activated rows is three (B, D, F). When the four columns (a, c, e, g) are activated, the area of the temporary submatrix is 3×4=12. Since the total number of markers received by the four columns (a, c, e, g) is "7", the density is 7/12=0.58. On the other hand, when the column a having a small number of received markers is pruned, and three columns (c, e, g) are activated, the area of the temporary submatrix is 3×3=9, and the total number of markers received by the three columns (c, e, g) is "6". Therefore, the density is 6/9=0.67. Through this pruning, the area of the temporary submatrix is reduced but the density thereof increases.

Generally, the submatrix whose area is as large as possible and whose density is as high as possible can preferably be extracted.

In this embodiment, the threshold value for pruning in the steps S23, S25 of FIG. 7 is set using one of the following three policies described below.

(Policy 1) The submatrix whose area is not less than a given area and whose density is maximum is obtained.

(Policy 2) The submatrix whose density is not less than a given density and whose area is maximum is obtained.

(Policy 3) The submatrix whose size (the number of rows and the number of columns) is not less than a given size and whose density is maximum is obtained.

When using policy 1, the threshold value is set at a value for making the size of the temporary submatrix not less than a given size and for making the density maximum.

When using policy 2, the threshold value is set at a value for making the density not less than a given value and for making the size of the temporary submatrix maximum.

When using policy 3, the threshold value is set at a value for making both of the number of the rows and the number of the columns of the temporary submatrix not less than a given value and for making the density maximum.

It is now assumed that the number of activated columns is "5", rows (A, B, C, D, E, F, G, H, I, J) receive the markers propagated from the five columns, and the number of markers received by the rows is as shown in FIG. 9.

FIG. 10 shows the area and density of the obtained temporary submatrix, while the pruning threshold value is in a range of "1" to "5". In FIG. 10, for example, when the threshold value is "3", the row having the number of received markers of "2" or less is pruned from the rows having received the markers of FIG. 9, and six rows (A, B, C, D, E, F) are activated. The total number of markers received by the six rows is "24". Therefore, when the number of activated columns is "5", the area is 6×5=30, and the density is 24/30=0.8.

Here, an example for obtaining the temporary submatrix whose area is "25" or more and whose density is maximum will be described as an example of (Policy 1). As seen from FIG. 10, the threshold value needs to be any one of "3", "2", and "1" in order to satisfy a condition that the area is "25" or more. Among these values, the threshold value which maximizes the density is "3", and the threshold value for the pruning is therefore set to "3".

An example for obtaining the submatrix whose density is 75% or more and whose area is maximum will be described as an example of (Policy 2). As seen from FIG. 10, the threshold value needs to be any one of "3", "4", and "5" so that the density is 75% or more. Therefore, among these values, "3" is selected as the threshold value which maximizes the area.

An example for obtaining the submatrix whose number of rows/columns is "5" or more and whose density is maximum will be described as an example of (Policy 3). As seen from FIG. 10, the threshold value needs to be any one of "3", "2", and "1" so that the number of rows/columns is "5" or more. Therefore, among these values, "3" is selected as the threshold value which maximizes the density.

As described above, according to the third embodiment, the threshold value to the maker counters (the number of markers received by the rows/columns), the threshold value being used as a criterion when selecting one or more columns/rows, is set at the time of selecting one or more columns/rows in step S23 and step S24 shown in FIG. 7, so as to satisfy the given policy. Thereby, the submatrix, which is configured by the selected rows and columns when a given convergence condition is satisfied, and is the data group having the relation, can easily be extracted at a high processing speed from the plurality of data originally having no apparent order or similarities (distance), such as those relating customer to item.

When the threshold value is set to the number of received markers in order to satisfy any one of the aforementioned three policies at the time of selecting the rows or the columns, the submatrix (data group having the relation) having a desired size/density/shape can easily be extracted at a high processing speed.

Moreover, for example, when the customers and items are pruned during the processing, the submatrix (data group having the relation) can efficiently be extracted from an enormous amount of records.

Therefore, information useful for marketing, and the like can easily be extracted from the enormous amount of records at a high processing speed.

Additionally, in the second and third embodiments, the marker bit and marker counter for each row/column are used to total the number of received markers. However, even when only the counter for each row/column is used without using the marker bit, the effect similar to the aforementioned effect can be obtained. That is, the counter for each column (or row) that corresponds to the activated row (or column) is incremented by "1", and the value of the counter for each column (or row) is checked at the time of totaling of markers. The counter value corresponds to the number of received markers (the number of marker bits having the value "1"). Every time the totaling of markers and pruning end, the counter value for each row/column may be reset (e.g., to "0").

Moreover, the methods described in the first to third embodiments may be stored as a program which can be executed by a computer in recording mediums such as DVD, CD-ROM, flexible disk, optical disk, etc., and distributed.

Figure 12:
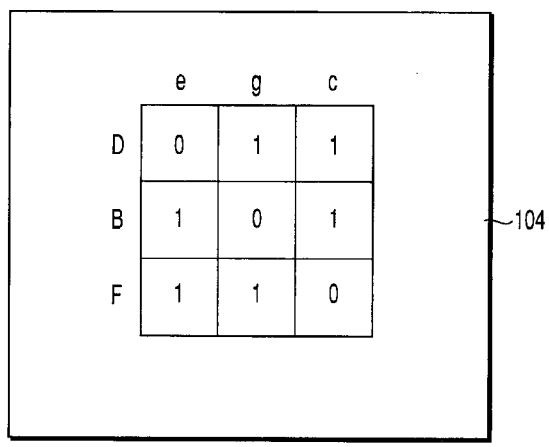
FIG. 12 is a view showing a display example of a processing result of the information processing apparatus of FIG. 11.

The recording medium (e.g., CD-ROM) in which the program with the processing procedure as the embodiment of the present invention described therein is stored is set, for example, in the CD-ROM drive 110, and the predetermined operation is performed. When the program is installed in the hard disk 105 in this manner, the methods described in the first to third embodiments can be executed by the information processing apparatus of FIG. 11. When one of the methods described in the first to third embodiments are executed, the records stored in the hard disk 105 are processed, and the submatrix extracted from the matrix shown in FIG. 3 is displayed in the display 104 shown in FIG. 12. Moreover, the processing process shown in FIG. 6 may be displayed.

The present invention can also be applied, for example, to a questionnaire survey, analysis of access to a WWW page, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data extraction method comprising:

storing a plurality of objects to be processed in a memory device, each of the objects including a single set of two data entities which differ in attribute from each other;

converting each of the objects stored in the memory device to one of elements arranged in a matrix, by setting one of the two data entities at a row of the matrix and the other at a column of the matrix;

extracting from the matrix a submatrix which is generated by replacing rows and columns of the matrix and is dense with the objects, the submatrix being configured by a part of the matrix.

2. A method according to claim 1, wherein one of the two data entities corresponds to a customer and the other corresponds to an item bought by the customer.

3. A data extraction method comprising:

storing a plurality of objects to be processed in a memory device, each of the objects including a single set of two data entities which differ in attribute from each other;

converting each of the processing objects stored in the memory device to one of elements arranged in a matrix, by setting one of the two data entities at a row of the matrix and the other at a column of the matrix;

selecting one or more columns from all of the columns of the matrix based on the number and positions of the objects located in each of the columns, to obtain one or more selected columns, selecting one or more rows from all of the rows of the matrix based on the number and positions of the objects located in each of the rows, to obtain one or more selected rows, extracting from the matrix a submatrix which is configured by the selected columns and the selected rows, and is dense with the objects.

4. A data extraction method comprising:

storing a plurality of objects to be processed in a memory device, each of the objects including a single set of three data entities which differ in attribute from one another;

converting each of the objects stored in the memory device to an element in a 3-dimensional space including a plurality of axes each of which corresponds to the attribute, the three data entities corresponding to x-, y- and z-components in the 3-dimensional space respectively;

extracting a subspace which is generated by replacing data arrays corresponding to each axis and is dense with the objects, from the 3-dimensional space.

5. A method according to claim 3, wherein one of the three data entities corresponds to a customer and one of the other two data entities corresponds to an item bought by the customer.

6. A data extraction method comprising:

(a) storing a plurality of objects to be processed in a memory device, each of the objects including a single set of two data entities which differ in attribute from each other;

(b) converting each of the objects stored in the memory device to one of elements arranged in a matrix, by setting one of the two data entities at a row of the matrix and the other at a column of the matrix;

(c) selecting one row from the matrix to obtain a selected row;

(d) detecting one or more columns which cross the selected row through one of the objects, to obtain one or more detected columns;

(e) increasing one or more first counters corresponding to the one or each of the more detected columns by 1;

(f) selecting one or more columns based on values of the first counters, to obtain one or more selected columns;

(g) detecting one or more rows which cross the one or each of the more selected columns through one of the objects, to obtain one or more detected rows;

(h) increasing one or more second counters corresponding to the one or each of the more detected rows by 1;

(i) selecting one or more rows based on values of the second counters, to obtain one or more selected rows;

(j) detecting one or more columns which are cross the one or each of the more selected rows through one of the object, to obtain one or more detected columns;

(k) repeating steps (e)–(j) until the selected columns and the selected rows satisfy a given convergence condition;

(l) extracting from the matrix a submatrix which is configured by the selected columns and the selected rows when the given convergence condition is satisfied, and is dense with the objects.

7. A method according to claim 4, wherein the step (f) includes setting a first threshold value to the first counters, the first threshold value being used as a criterion when selecting one or more rows, based on at least one of a size of a temporary submatrix which is configured by the selected columns and the selected rows, and a proportion of the number of the objects located in the temporary submatrix to the size of the temporary submatrix.

8. A method according to claim 7, wherein the first threshold value is set at a value for making the size of the temporary submatrix larger than a given size and for making the proportion maximum.

9. A method according to claim 7, wherein the first threshold value is set at a value for making the proportion larger than a given value and for making the size of the temporary submatrix maximum.

10. A method according to claim 7, wherein the first threshold value is set at a value for making both of the number of the rows and the number of the columns of the temporary submatrix larger than a given value and for making the proportion maximum.

11. A method according to claim 6, wherein step (i) includes setting a second threshold value to the second counters, the second threshold value being used as a criterion when selecting one or more columns, based on at least one of a size of a temporary submatrix which is configured by the selected columns and the selected rows, and a proportion of the number of the objects located in the temporary submatrix to the size of the temporary submatrix.

12. A method according to claim 11, wherein the second threshold value is set at a value for making the size of the temporary submatrix larger than a given size and for making the proportion maximum.

13. A method according to claim 11, wherein the second threshold value is set at a value for making the proportion larger than a given value and for making the size of the temporary submatrix maximum.

14. A method according to claim 11, wherein the second threshold value is set at a value for making both of the number of the rows and the number of the columns of the temporary submatrix larger than a given values and for making the proportion maximum.

15. A data extraction method comprising:

(a) storing a plurality of objects to be processed in a memory device, each of the objects including a single set of two data entities which differ in attribute from each other;

(b) converting each of the objects stored in the memory device to one of elements arranged in a matrix, by setting one of the two data entities at a row of the matrix and the other at a column of the matrix;

(c) selecting one column from the matrix to obtain a selected column;

(d) detecting one or more rows which cross the selected column through one of the objects, to obtain one or more detected rows;

(e) increasing one or more first counters corresponding to the one or each of the more detected rows by 1;

(f) selecting one or more rows based on values of the first counters, to obtain one or more selected rows;

(g) detecting one or more columns which cross the one or each of the more selected rows through one of the objects, to obtain one or more detected columns;

(h) increasing one or more second counters corresponding to the one or each of the more detected columns by 1;

(i) selecting one or more columns based on values of the second counters, to obtain one or more selected columns;

(j) detecting one or more rows which are cross the one or each of the more selected columns through one of the object, to obtain one or more detected rows;

(k) repeating steps (e)–(j) until the selected rows and the selected columns satisfy a given convergence condition;

(l) extracting from the matrix a submatrix which is configured by the selected rows and the selected columns when the given convergence condition is satisfied, and is dense with the objects.

16. An information processing apparatus comprising:

a memory device configured to store a plurality of objects to be processed, each of the objects including a single set of two data entities which differ in attribute from each other;

a converter configured to convert each of the objects stored in the memory device to one of elements arranged in a matrix, by setting one of the two data entities at a row of the matrix and the other at a column of the matrix;

a data extraction device configured to extract from the matrix a submatrix which is generated by replacing rows and columns of the matrix and is dense with the objects, the submatrix being configured by a part of the matrix.

17. An information processing apparatus comprising:

a memory device configured to store a plurality of objects to be processed, each of the objects including a single set of two data entities which differ in attribute from each other;

a converter configured to convert each of the objects stored in the memory device to one of elements arranged in a matrix, by setting one of the two data entities at a row of the matrix and the other at a column of the matrix;

a first selector configured to select one or more columns from all of the columns of the matrix based on the number and positions of the objects located in each of the columns, to obtain one or more selected columns, a second selector configured to select one or more rows from all of the columns of the matrix based on the number and positions of the objects located in each of the rows, to obtain one or more selected rows, a data extraction device configured to extract from the matrix a submatrix which is configured by the selected columns and the selected rows, and is dense with the objects.

18. An information processing apparatus comprising:

a memory device configured to store a plurality of objects to be processed, each of the objects including a single set of two data entities which differ in attribute from each other;

a converter configured to convert each of the objects stored in the memory device to one of elements arranged in a matrix, by setting one of the two data entities at a row of the matrix and the other at a column of the matrix;

a plurality of first counters, each of which corresponds to each column, a plurality of second counters, each of which corresponds to each row, a first selector configured to select one row from the matrix to obtain a selected row;

a second selector which selects one or more columns and one or more rows beginning at the selected row to obtain one or more selected columns and one or more selected rows, by repeating a first process and a second process alternately, until the selected columns and the selected rows satisfy a given convergence condition, and an extraction device configured to extract from the matrix a submatrix which is configured by the selected columns and the selected rows when the given convergence condition is satisfied, and is dense with the objects, the first process detecting one or more columns which cross the selected rows including the selected row through one of the objects, to obtain one or more detected columns, increasing one or more first counters corresponding to the one or each of the more detected columns by 1, and selecting one or more columns based on values of the first counters, and the second process detecting one or more rows which cross the selected columns through one of the objects, to obtain one or more detected rows, increasing one or more second counters corresponding to one or each of the more detected rows by 1, and selecting one or more rows based on values of the second counters.

19. A computer program stored on a computer readable medium, the computer including a memory device which stores a plurality objects to be processed, each of the objects including a single set of two data entities which differ in attribute from each other, the computer program comprising:

first program instruction means for instructing a computer processor to convert each of the objects stored in the memory device to one of elements arranged in a matrix, by setting one of the two data entities at a row of the matrix and the other at a column of the matrix;

second program instruction means for instructing the computer processor to extract from the matrix a submatrix which is generated by replacing the rows and the columns of the matrix and is dense with the objects.

20. A computer program stored on a computer readable medium, the computer including a memory device which stores a plurality of objects to be processed, each of the objects including a single set of two data entities which differ in attribute from each other, the computer program comprising:

first program instruction means for instructing a computer processor to convert each of the objects stored in the memory device to one of elements arranged in a matrix, by setting one of the two data entities at a row of the matrix and the other at a column of the matrix;

second program instruction means for instructing the computer processor to select one or more columns from all of the columns of the matrix based on the number and positions of the objects located in each of the columns, to obtain one or more selected columns;

third program instruction means for instructing the computer processor to select one or more rows from all of the rows of the matrix based on the number and positions of the objects located in each of the rows, to obtain one or more selected rows;

fourth program instruction means for instructing the computer processor to extract from the matrix a submatrix which is configured by the selected columns and the selected rows, and is dense with the objects.

* * * * *